(12) United States Patent
Au et al.

(10) Patent No.: US 8,442,113 B2
(45) Date of Patent: May 14, 2013

(54) EFFECTIVE RATE CONTROL FOR VIDEO ENCODING AND TRANSCODING

(75) Inventors: Oscar Chi-Lim Au, Kowloon (HK); Chi Wang Ho, Tai Po (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 1878 days.

(21) Appl. No.: 11/553,877

(22) Filed: Oct. 27, 2006

(65) Prior Publication Data

US 2007/0098064 A1    May 3, 2007

(30) Foreign Application Priority Data

Oct. 28, 2005    (GB) .................................. 0522036.3

(51) Int. Cl.
*H04N 7/12* (2006.01)
(52) U.S. Cl.
USPC ................................ 375/240.03; 375/240.04
(58) Field of Classification Search ............. 375/240.03, 375/240.04
See application file for complete search history.

(56) References Cited

U.S. PATENT DOCUMENTS

| 5,144,424 | A * | 9/1992 | Savatier .................. 375/240.03 |
| 6,111,991 | A * | 8/2000 | Ribas-Corbera et al. ..... 382/251 |
| 6,650,707 | B2 * | 11/2003 | Youn et al. ............... 375/240.12 |
| 7,535,959 | B2 * | 5/2009 | Lightstone et al. ....... 375/240.04 |
| 7,606,427 | B2 * | 10/2009 | Malayath et al. ............ 382/232 |
| 2006/0114989 | A1 * | 6/2006 | Panda ...................... 375/240.03 |

OTHER PUBLICATIONS

I-Ming Pao, Ming-Ting Sun; Modeling DCT Coefficients for Fast Video Encoding; Jun. 1999; IEEE Transactions on Circuits and Systems for Video Technology; vol. 9, No. 4; pp. 608-616.*

Ribas-Corbera Jordi, Lei Shawmin; Rate Control in DCT Video Coding for Low-Delay Communications; Feb. 1999; IEEE Transactions on Circuits and Systems for Video Technology; vol. 9, No. 1; pp. 172-185.*

Lei Zhijun, Georganas Nicolas D.; Accurate Bit Allocation and Rate Control for DCT Domain Video Transcoding; 2002; IEEE CCECE2002 Canadian Conference on Electrical and Computer Engineering; vol. 2; pp. 968-973.*

Zhijun Lei, Nicolas D. Georganas, "Accurate Bit Allocation and Rate Control for DCT Domain video Transcoding," pp. 968-973, University of Ottawa, Ottawa, Canada, 2002.

Kwang-Deok Sea, Sang-Hee Lee, Jae-Kyoon Kim, Jong-Seog Koh, "Rate Control Algorithm for Fast Bit-Rate Conversion Transcoding," pp. 1128-1136, Wireless Communication Research Lab, Korea Telecom, Korea, 2000.

Jordi Ribas-Corbera, Shawmin Lei, "Rate Control in DCT Video Coding for Low-Delay Communications," pp. 172-185, vol. 9, No. 1, IEEE Transactions on Circuits and Systems for Video Technology, Feb. 1999.

(Continued)

*Primary Examiner* — Joseph Ustaris
*Assistant Examiner* — Maria Vazquez Colon
(74) *Attorney, Agent, or Firm* — Scwabe, Williamson & Wyatt, P.C.

(57) ABSTRACT

The quantization factor for each block of pixels in an image or video encoding or transcoding method is determined. The blocks of pixels are classified according to predefined criteria and the blocks are processed according to the resulting classification. The predefined criteria include, for example, anticipated characteristics of the blocks after quantization, such as the transform coefficients after quantization and/or the total number of non-zero transform coefficients.

18 Claims, 7 Drawing Sheets

OTHER PUBLICATIONS

Yuan Wu, Lin Shouxun, Zhang Yongdon, Luo Haiyong, "Optimum bit Allocation and Rate Control for H.264/AVC," pp. 1-16, Institute of Computing Technology, Academy of Science, China.

Thomas R. Gardos, "Video Codec Test Model, Near-Term, Version 8 (TMN8)," pp. 1-16, Video Coding Experts Group, Study Group 16, 1997.

* cited by examiner

EFFECTIVE RATE CONTROL FOR VIDEO ENCODING AND TRANSCODING

CROSS-REFERENCE TO RELATED APPLICATIONS

This application claims priority to United Kingdom Patent Application 0522036.3, filed Oct. 28, 2005, which is incorporated herein by reference in its entirety.

FIELD OF THE INVENTION

This invention relates generally to digital signal compression, coding and representation, and more particularly to a video compression, coding and representation system using a rate control algorithm and having both apparatus and method aspects. It further relates to a computer program product, such as a recording medium, carrying program instructions readable by a computing device to cause the computing device to carry out a method according to the invention.

BACKGROUND

Due to the huge size of raw digital video data (or image sequences), compression must be applied to such data so that they may be transmitted and stored. There have been many important video compression standards, including the ISO/IEC MPEG-1, MPEG-2, MPEG-4 standards and the ITU-T H.261, H.263, H.264 standards. The ISO/IEC MPEG-1/2/4 standards are used extensively by the entertainment industry to distribute movies, digital video broadcast including video compact disk or VCD (MPEG-1), digital video disk or digital versatile disk or DVD (MPEG-2), recordable DVD (MPEG-2), digital video broadcast or DVB (MPEG-2), video-on-demand or VOD (MPEG-2), high definition television or HDTV in the US (MPEG-2), etc. The later MPEG-4 was more advanced than MPEG-2 and can achieve high quality video at a lower bit rate, making it very suitable for video streaming over the internet, digital wireless network (e.g. 3G network), multimedia messaging service (MMS standard from 3GPP), etc. MPEG-4 is accepted into the next generation high definition DVD (HD-DVD) standard and the MMS standard. The ITU-T H.261/3/4 standards are designed for low-delay video phone and video conferencing systems. The early H.261 was designed to operate at bit rates of p*64 kbit/s, with p=1, 2, ..., 31. The later H.263 is very successful and is widely used in modern day video conferencing systems, and in video streaming in broadband and in wireless networks, including the multimedia messaging service (MMS) in 2.5G and 3G networks and beyond. The latest H.264 (also called MPEG-4 Version 10, or MPEG-4 AVC) is currently the state-of-the-art video compression standard. It is so powerful that MPEG decided to jointly develop with ITU-T in the framework of the Joint Video Team (JVT). The new standard is called H.264 in ITU-T and is called MPEG-4 Advance Video Coding (MPEG-4 AVC), or MPEG-4 Version 10. H.264 is used in the HD-DVD standard, Direct Video Broadcast (DVB) standard and probably the MMS standard. Based on H.264, a related standard called the Audio Visual Standard (AVS) is currently under development in China. AVS 1.0 is designed for high definition television (HDTV). AVS-M is designed for mobile applications. Other related standards may be under development. H.264 has superior objective and subjective video quality over MPEG-1/2/4 and H.261/3. The basic encoding algorithm of H.264 is similar to H.263 or MPEG-4, except that integer 4×4 discrete cosine transform (DCT) is used instead of the traditional 8×8 DCT and there are additional features including intra-prediction mode for I-frames, multiple block sizes and multiple reference frames for motion estimation/compensation, quarter pixel accuracy for motion estimation, in-loop deblocking filter, context adaptive binary arithmetic coding, etc. See Test Model 5, ISO-IEC/JTC1/SC29/WG11, April 1993, Document AVC 491b, Document 2, which is herein incorporated by reference in its entirety.

These coding algorithms are a hybrid of inter-picture prediction that utilize temporal redundancy and transform coding of the remaining signal to reduce spatial redundancy. Then, the transformed signal is coded using entropy coding methods. Because of the nature of these coding algorithms, the resulting video data has a variable bit-rate (VBR). If the encoding parameters are kept constant during the encoding process, the number of bits in each encoded frame is likely to be very different. This causes big problems in transmission, since most practical networks cannot cope with a large variation in bit-rate.

Typically, rate control of video encoding or transcoding can be described as a constrained optimization problem. The goal is to find the optimal quantization parameters that minimize distortion subject to the target bit budget:

$$Q_1^*, Q_2^*, \ldots, Q_N^*, \lambda^* = \arg\min_{Q_1, Q_2 \ldots Q_N, \lambda} \sum_{i=1}^{N} D_i + \lambda \left( \sum_{i=1}^{N} B_i - B \right)$$

where $Q_1, Q_2, \ldots, Q_N$ and $Q_1^*, Q_2^*, \ldots, Q_N^*$ is a set of quantization parameters (QPs) and their optimal values, $\lambda$ and $\lambda^*$ is the Lagrange multiplier and its optimal value, $D_i$ and $B_i$ is the distortion and rate of $i^{th}$ macroblock and B is the target bit budget. In order to determine the optimal quantization parameters and achieve the rate accurately, many R-Q and D-Q models have been proposed. In case of encoding, TM5, TMN-5, TMN-8 and JM are proposed. See Test Model 5 referenced above, and J. Ribas-Corbera and S. Lei, "Rate control in DCT video coding for low delay communications," *IEEE Transactions on Circuits and Systems for Video Technology*, vol. 9, no. 1, pp. 172-185, February 1999, which is herein incorporated by reference in its entirety. TMN-8 outperforms the other schemes in terms of PSNR, and, at the same time, maintains a low processing delay. On the other hand, in the case of transcoding, since additional information from the encoded bitstream is available, simplified rate control schemes have been proposed by re-using this information in different ways, such as the complexity measurement of macroblock and quantization parameter determination, to reduce the complexity. For example, see Z. Lei and N. D. Georganas, "Accurate bit allocation and rate control for DCT domain video transcoding," in *IEEE Canadian Conference on Electrical and Computer Engineering*, vol. 2, May 2002, pp. 968-973, and K.-D. Seo, S.-H. Lee, J.-K. Kim and J.-S. Koh, "Rate control algorithm for fast bit-rate conversion transcoding." *IEEE Transactions on Consumer Electronics*, vol. 46, no. 4, pp. 1128-1136, November 2000, which are both herein incorporated by reference in their entirety.

However, both of these algorithms did not consider the characteristics of the macroblocks after quantization or re-quantization in the phase of bit allocation and QP determination. If all quantized coefficients in the macroblock, including both luminance and chrominance blocks are zero, in general, the allocated number of bits for this macroblock is more than the actual number of bits needed to code it, which can affect the bit allocation for the other macroblocks in the frame.

The proposed TMN-8 rate control algorithm seeks to minimize the mean square error (MSE) distortion subject to the rate constraints by Lagrange optimization techniques. See J. Ribas-Corbera et al. reference above. It can achieve the target bit-rate accurately, a high quality and keeping a low buffer delay. Because of its excellent performance, it was adopted in a test model of H.263+. See ITU-T/SG15, Video codec test model, TMN-8m Portland, June 1997, which is hereby incorporated by reference in its entirety. TMN-8 consists of two parts: frame layer bit allocation; and macroblock layer rate control. At the frame layer bit allocation, the number of bits allocated to the current frame is determined based on the bit-rate and current buffer fullness. If the buffer level exceeds a certain level, several frames will be skipped to maintain a steady buffer occupancy. At the macroblock layer rate control, the algorithm calculates the complexity of the current frame and each macroblock in terms of standard deviation. Then, the optimal quantization step size for the $i^{th}$ macroblock is obtained by the following equation:

$$Q_i^* = \sqrt{\frac{256K}{(B-256NC)} \frac{\sigma_i}{\alpha_i} S_i}, \quad (1)$$

$$i = 1, 2, \ldots, N$$

where K is the model parameter, which updates after encoding of each macroblock, C is the average bits used to encode the overhead information, such as header, motion information, etc, B is the remaining bits for the current frame, $\sigma_i$ is the standard deviation of $i^{th}$ macroblock, $\alpha_i$ is a weighting for the $i^{th}$ macroblock, which is used as a parameter for controlling the quantization overhead at low bit-rate, and $$S_i = \sum_{k=i}^{N} \alpha_k \sigma_k$$

can be viewed as a complexity measurement of the remaining macroblocks in a frame. The model parameters K and C will be updated after encoding each macroblock by using weighted sum.

In the rate control of hybrid video coding, the rate control will estimate the number of bits needed for each macroblocks based on its complexity and rate constraints and then determine the quantization parameter for each macroblock. The model parameters will be updated after encoding each macroblock to adapt to the statistics of video content. However, under a low bit-rate situation, all transformed and quantized residue coefficients usually tend to be very small or even zero. As a result, for these macroblocks, the estimated number of bits needed for them tends to be larger than the actual number of bits needed. This causes an error in the rate control algorithm and the feedback mechanism will try to correct this error and adjust the model parameter accordingly. This causes an undesirable effect when the rate control algorithm performs the bit allocation to the macroblock with substantial energy left after quantization.

SUMMARY OF THE INVENTION

According to the present invention there is provided a method for deciding the quantization factor for each block of pixels in an image or video encoding or transcoding method, wherein the blocks of pixels are classified according to predefined criteria and the blocks are processed according to the resulting classification.

In preferred embodiments of the invention the predefined criteria include anticipated characteristics of the blocks after quantization such as, for example, the transform coefficients after quantization and/or the total number of non-zero transform coefficients.

In a preferred embodiment of the invention the blocks are classified into a first group of zero residue blocks with all anticipated quantized transform coefficients being zero, and a second group of non-zero residue blocks with at least one anticipated quantized transform coefficient being non-zero. The transform coefficients may be found by anticipating the total number of bits to be used to encode the quantized transform coefficients and considering that the coefficient is zero if the anticipated number of bits is below a predetermined number. The anticipated number of bits and the predetermined number may be based on past history or on the statistics of neighboring blocks.

In some embodiments of the invention the blocks may be classified as either "probably zero residue blocks" or "probably non-zero residue blocks" based on the statistics of temporally and/or spatially neighboring blocks and different predetermined numbers are used accordingly.

In embodiments of the invention where the method is carried out in conjunction with a transcoding method, the anticipated number of bits to encode each block may be a function of the input bit rate for the block and the expected bit rate reduction due to transcoding.

Preferably only non-zero residue blocks are considered in a rate control optimization algorithm in said image or video encoding method.

In some embodiments of the invention the blocks may be divided into luminance sub-blocks and chrominance sub-blocks and the anticipated characteristics include the number of non-zero transform coefficients. The anticipated characteristics of the blocks may include the number of non-zero transform coefficients of the luminance sub-blocks and the chrominance sub-blocks after quantization.

According to another aspect of the invention there is provided a method for deciding the quantization factor for each block of pixels in an image or video transcoding method, wherein the blocks of pixels are classified according to the transform coefficients after quantization and/or the total number of non-zero transform coefficients and the blocks are processed according to the resulting classification.

According to a further aspect of the invention there is provided a method for deciding the quantization factor for each block of pixels in an image or video encoding method, wherein the blocks of pixels are classified according to the transform coefficients after quantization and/or the total number of non-zero transform coefficients and the blocks are processed according to the resulting classification.

According to the present invention there is also provided systems and software products designed to perform the above methods.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
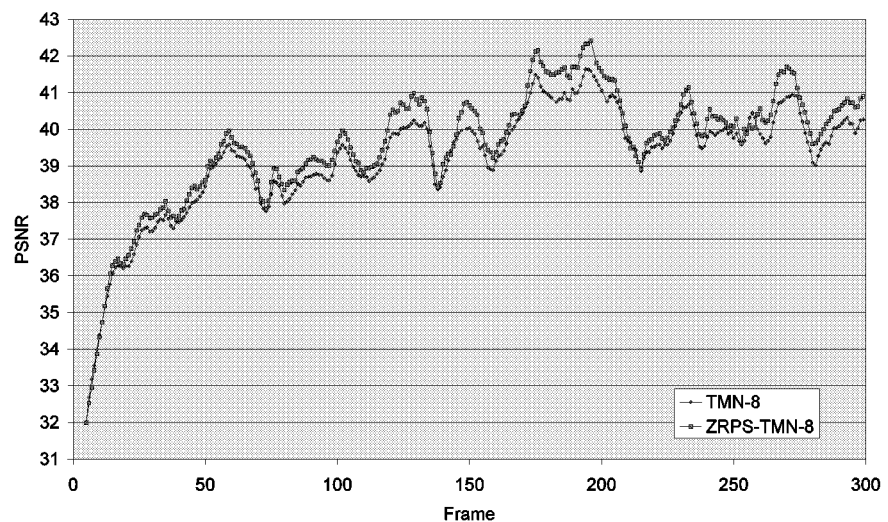
FIG. 1 shows the PSNR (Peak Signal-to-Noise Ratio) of test sequence "akiyo" converted from 384 kdps to 64 kbps with both in accordance with the prior art and in accordance with an embodiment of the invention.

In the present application, a new scheme is proposed which may be named Zero-Residue Pre-Selection Scheme (ZRPS) which avoids involving macroblocks with zero residues in the bit allocation and QP determination process and hence improves the effectiveness of any existing rate control scheme. This scheme is applicable in both video encoding and transcoding particularly under low bit-rate environments and may be used in conjunction with any existing encoding or transcoding method.

In the proposed ZRPS, a subset of macroblocks is selected which contain substantial residual energy prior to the rate control algorithm. This can reduce complexity while achieving better quality compared to blindly applying rate control to the whole frame. We first define a zero-residue map for frame t, $ZRM_t[i]$, where i is the macroblock index, as follows. If all quantized coefficients of the $i^{th}$ macroblock, including all luminance and chrominance blocks in the macroblock, are zero after quantization, $ZRM_t[i]=0$, otherwise, $ZRM_t[i]=1$. However, since this zero-residue map can be obtained only after quantization, we have to predict this in advance in order to use it for rate control. The ZRPS mechanism provides a way to predict the $ZRM_t[i]$ in both encoding and transcoding situations as will be explained in the following section.

The Zero-Residue Pre-Selection (ZRPS) Mechanism for Encoding

In encoding situation, we try to predict $ZRM_t[i]$ of the current frame given the information of previous frames t−1 and the neighboring encoded macroblocks in the current frame.

Let $b_i^t$ be the number of bits spent to code the coefficients of $i^{th}$ macroblock in frame t, $\tilde{b}_i^t$ be the estimated number of bits needed to code the coefficients of $i^{th}$ macroblock in frame t, $b_{i,left}^t$, $b_{i,top}^t$ and $b_{i,top\text{-}right}^t$ be the number of bits spent to code the coefficients of the left, top and top-right macroblock with respect to $i^{th}$ macroblock in frame t and $\Delta_{i,left}^t$, $\Delta_{i,top}^t$, and $\Delta_{i,top\text{-}right}^t$ is the difference between the number of bits needed to code the left, top and top-right macroblock with respect to $i^{th}$ macroblock in frame t and frame t−1. We have two thresholds T1 and T2 in ZRPS, which represents in term of number of bits. Then, the ZRPS mechanism is shown as follows:

Step 1: Initialize the $ZRM_t$ for frame t based on the quantized coefficients of frame t−1. If all quantized coefficients of $i^{th}$ macroblock in frame t−1 are zero, $ZRM_t[i]=0$, otherwise, $ZRM_t[i]=1$.

Step 2: Estimate the number of bits needed for $i^{th}$ macroblock, $\tilde{b}_i^t$, as $b_i^{t-1} - avg(\Delta_{i,left}^t, \Delta_{i\text{-}top}^t, \Delta_{i,top\text{-}right}^t)$.

Step 3: For each macroblock with $ZRM_t[i]=1$.
If $\tilde{b}_i^t < T1$, update $ZRM_t[i]=0$.

Step 4: For each macroblock with $ZRM_t[i]=0$.
If $\tilde{b}_i^t > T2$, update $ZRM_t[i]=1$.

With the estimated $ZRM_t$, the rate control algorithm is only applied on the sub-set of macroblock with $ZRM_t[i]=1$. For those with $ZRM_t[i]=0$, the quantization parameter is similarly copy from the previous macroblock.

The Zero-Residue Pre-Selection (ZRPS) Mechanism for Transcoding

In case of transcoding, there is a slightly difference from the case of encoding as additional information from the input video bitstream is available, so the determination can be improved. Firstly, we need to define some variables. Let $b_i^t$ be the number of bits spent to code the coefficients of $i^{th}$ macroblock in input frame t, $\tilde{b}_i^t$ be the estimated number of bits needed to code the coefficients of $i^{th}$ macroblock in output frame t and $\Delta_i^{t-1}$ is the amount of bit reduction for coding the coefficients of $i^{th}$ macroblock of frame t−1 from the input video to output video. We have two thresholds $T_1$ and $T_2$ in ZRPS, which represents in term of number of bits. Then, the ZRPS mechanism is shown as follows:

Step 1: Initialize the $ZRM_t$ for frame t based on the quantized coefficients of frame t−1. If all quantized coefficients of $i^{th}$ macroblock in frame t−1 are zero, $ZRM_t[i]=0$, otherwise, $ZRM_t[i]=1$.

Step 2: Estimate the number of bits needed for $i^{th}$ macroblock, $\tilde{b}_i^t$, as $b_i^t - \Delta_i^{t-1}$.

Step 3: For each macroblock with $ZRM_t[i]=1$.
If $\tilde{b}_i^t < T_1$, update $ZRM_t[i]=0$.

Step 4: For each macroblock with $ZRM_t[i]=0$.
If $\tilde{b}_i^t > T_2$, update $ZRM_t[i]=1$.

With the estimated $ZRM_t$, the rate control algorithm is only applied on the sub-set of macroblock with $ZRM_t[i]=1$. For those with $ZRM_t[i]=0$, the quantization parameter is similarly copy from the previous macroblock.

In general, we find that, among all the blocks within a frame, some of the blocks do not need to be used in the same way as others to update the parameters. By selectively using some and not using others, better performance can be achieved. As an example, in the above, ZRM is used to identify some blocks to be processed differently. And by adaptively updating the parameters in a different way according to the characteristics of each block, better overall performance can be further achieved. In a similar way, at the frame level rate control, some of the frames do not need to be used in the same way as others to update the parameters. By adaptively updating the parameters, better performance can be achieved.

Simulation Results

Figure 2:
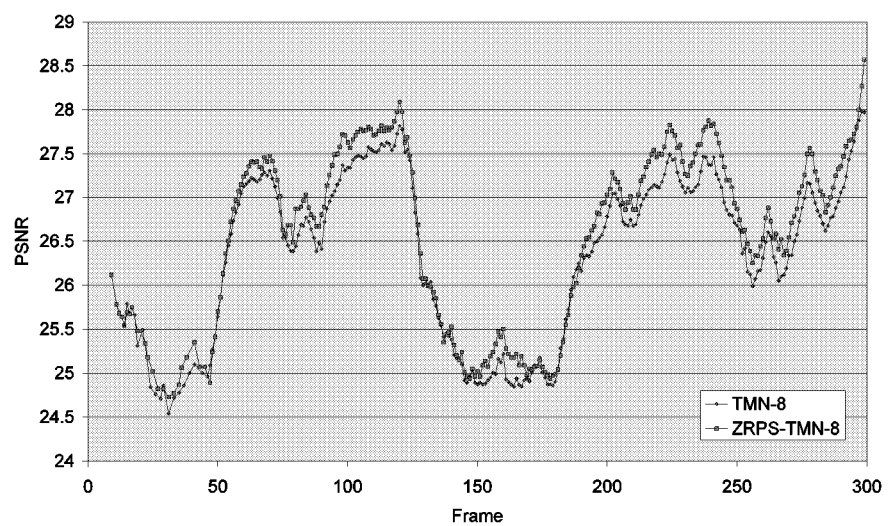
FIG. 2 shows the PSNR of test sequence "children" converted from 384 kdps to 64 kbps with both in accordance with the prior art and in accordance with an embodiment of the invention.
Figure 3:
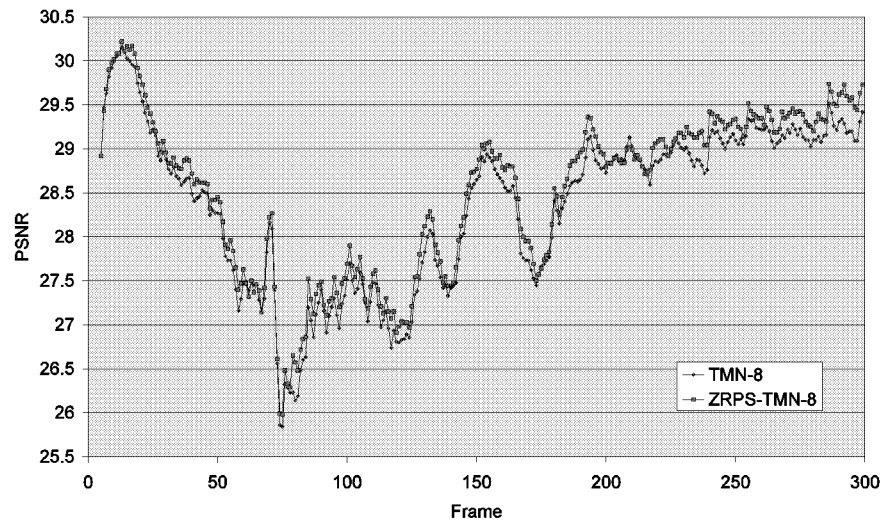
FIG. 3 shows the PSNR of test sequence "coastguard" converted from 384 kdps to 64 kbps with both in accordance with the prior art and in accordance with an embodiment of the invention.
Figure 4:
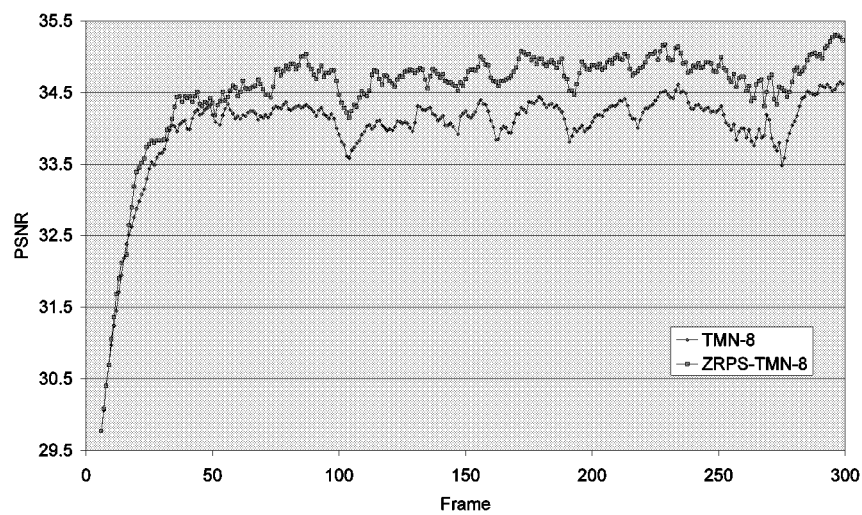
FIG. 4 shows the PSNR of test sequence "container" converted from 384 kdps to 64 kbps with both in accordance with the prior art and in accordance with an embodiment of the invention.
Figure 5:
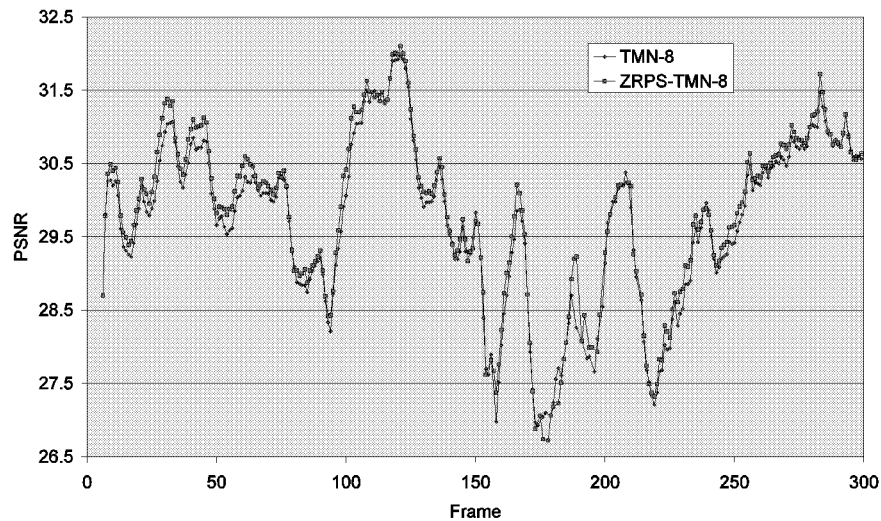
FIG. 5 shows the PSNR of test sequence "foreman" converted from 384 kdps to 64 kbps with both in accordance with the prior art and in accordance with an embodiment of the invention.
Figure 6:
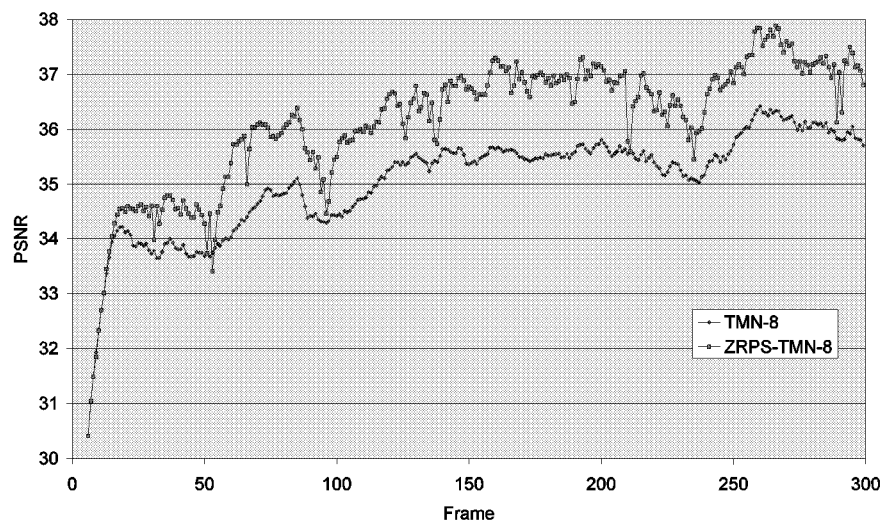
FIG. 6 shows the PSNR of test sequence "hall monitor" converted from 384 kdps to 64 kbps with both in accordance with the prior art and in accordance with an embodiment of the invention.
Figure 7:
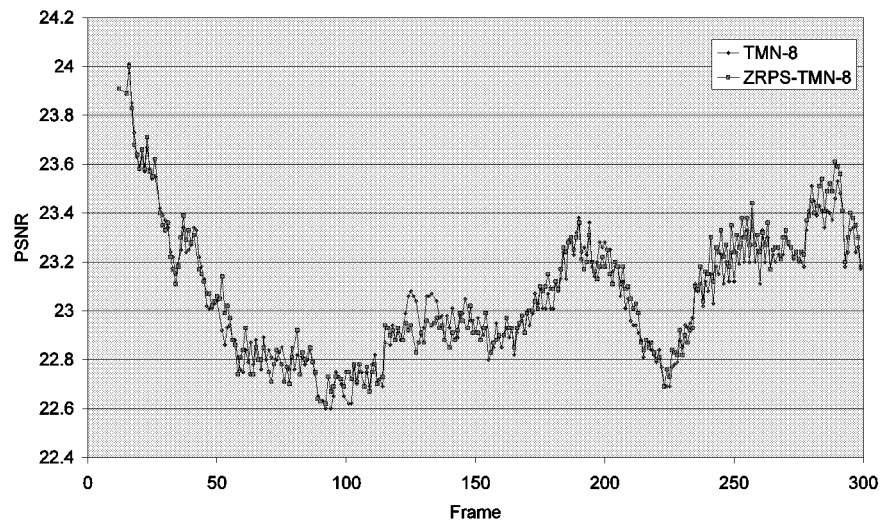
FIG. 7 shows the PSNR of test sequence "mobile" converted from 384 kdps to 64 kbps with both in accordance with the prior art and in accordance with an embodiment of the invention.
Figure 8:
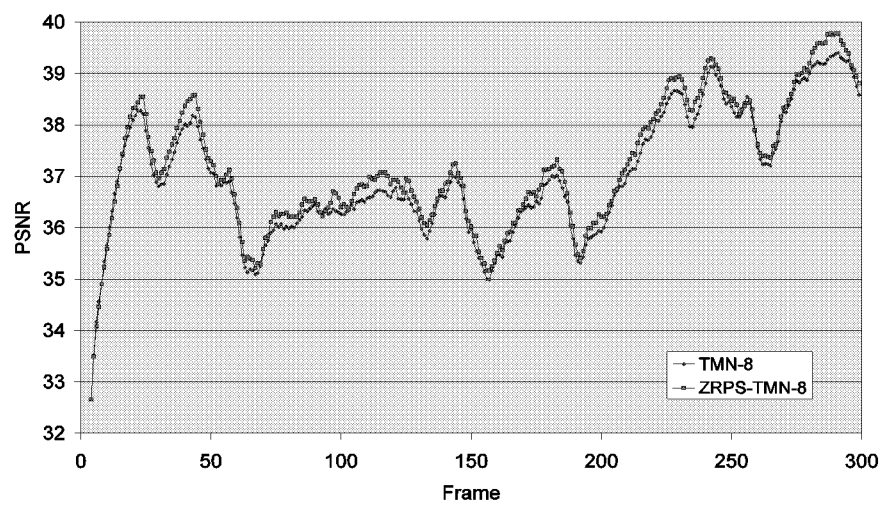
FIG. 8 shows the PSNR of test sequence "m&d" converted from 384 kdps to 64 kbps with both in accordance with the prior art and in accordance with an embodiment of the invention.
Figure 9:
FIG. 9 shows the PSNR of test sequence "sean" converted from 384 kdps to 64 kbps with both in accordance with the prior art and in accordance with an embodiment of the invention.
Figure 10:
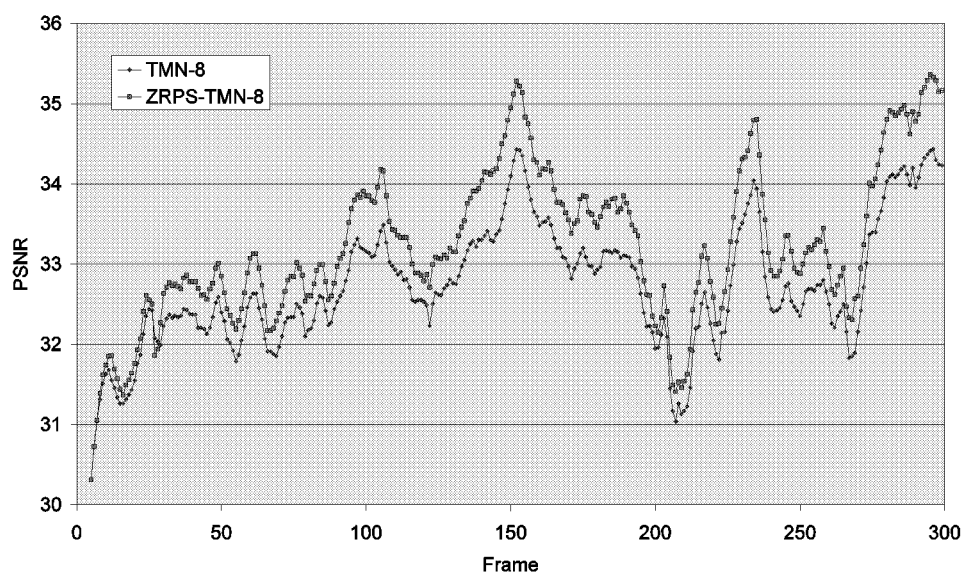
FIG. 10 shows the PSNR of test sequence "silent voice" converted from 384 kdps to 64 kbps with both in accordance with the prior art and in accordance with an embodiment of the invention.
Figure 11:
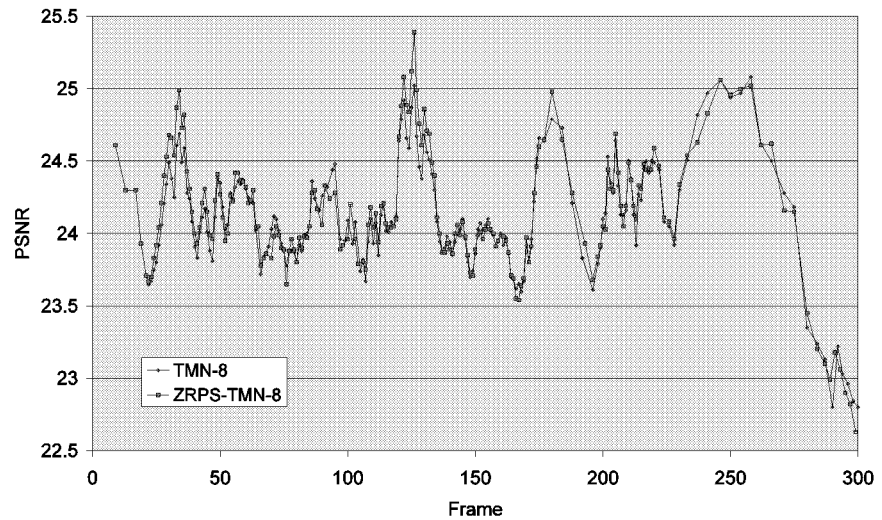
FIG. 11 shows the PSNR of test sequence "Stefan" converted from 384 kdps to 64 kbps with both in accordance with the prior art and in accordance with an embodiment of the invention.
Figure 12:
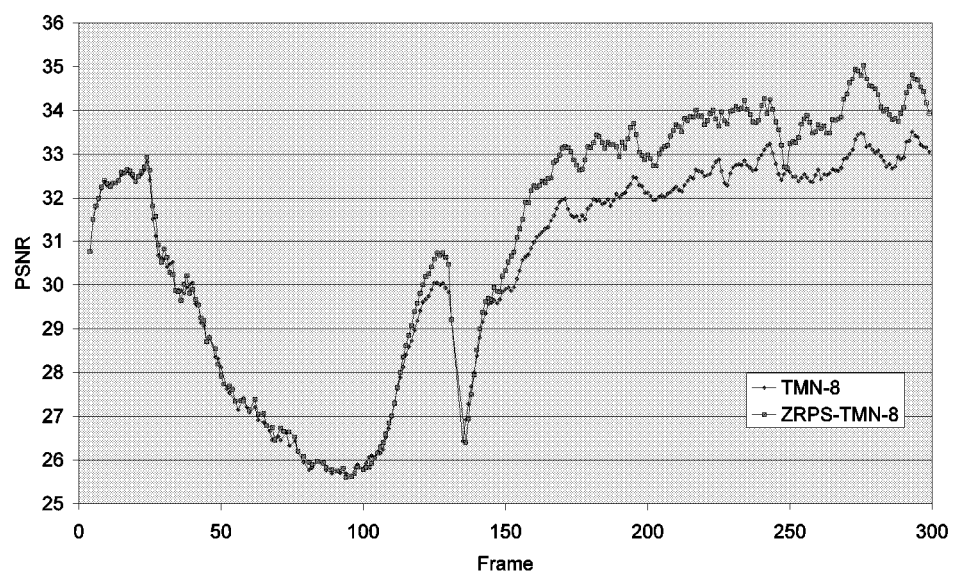
FIG. 12 shows the PSNR of test sequence "table" converted from 384 kdps to 64 kbps with both in accordance with the prior art and in accordance with an embodiment of the invention.
Figure 13:
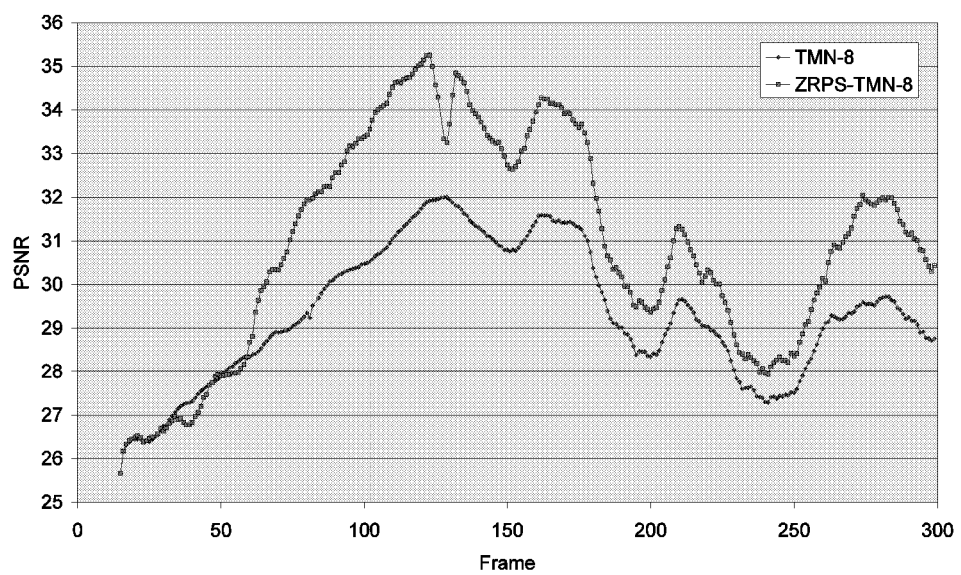
FIG. 13 shows the PSNR of test sequence "weather" converted from 384 kdps to 64 kbps with both in accordance with the prior art and in accordance with an embodiment of the invention.

The performance of the proposed ZRPS is evaluated. We implemented the proposed and TMN-8 rate control scheme in a H.263-to-H.263 transcoder based on H.263+ software developed by UBC, which is simply a cascaded of a decoder and an encoder. See Image Processing Lab, University of British Columbia, "TMN (H.263+) encoder/decoder, version 3.2," September 1997, which is herein incorporated by reference in its entirety. In this transcoder, the motion vectors from the input video are re-used with a small range refinement search. Thirteen QCIF test sequences are used, each with frame rate of 30 Hz and originally encoded in 384 kbps. The first frame was intra-coded (I frame) with QP=20. The remaining frames were all inter-coded (P frames). Then, these video are transcoded to 64 kbps (see FIGS. 1-13) and 96 kbps. In the simulation, we simply call the TMN-8 with ZRPS as ZRPS-TMN-8.

Table 1 shows the actual bit-rates achieved and the percentage of MBs processed by the two rate control strategies for converting a set of QCIF video sequences from 384 kbps to 64 kbps and from 384 kbps to 96 kbps. With our proposed ZRPS, ZRPS-TMN-8 can achieve bit-rate accurately as TMN-8.

In Table 2 and 3, we show the performance comparison between the two rate control schemes in terms of PSNR gain and speed. Comparing the total number of P frames encoded by the two rate control schemes, the proposed ZRPS-TMN-8 performs similarly and consistently as TMN-8. The average PSNR achieved by ZRPS-TMN-8 outperforms the one achieved by TMN-8, especially in sean and weather. Up to 1.60 dB PSNR gain is observed in comparison with TMN-8. Following figures show the PSNR over different test sequences. The curves of ZRPS-TMN-8 are similar or higher than the one of TMN-8. In term of speed, since only a small portion of MBs is involved in MB-layer rate control algorithm, the speed up factor is defined in terms of the number of MBs processed by the rate control.

$$\text{Speedup factor} = \frac{\text{the total number of macroblocks in the sequences}}{\text{the number of macroblocks processed}}$$

We can see that the speed up factor ranges from 1.41 to 4.55 times of the original TMN-8 among all of the test sequences. This significantly speeds up the rate control in video transcoding process.

TABLE 1

| | 384 kbps-to-64 kbps | | 384 kbps-to-96 kbps | |
| --- | --- | --- | --- | --- |
| Sequence | TMN-8 | ZRPS-TMN-8 | TMN-8 | ZRPS-TMN-8 |
| Akiyo | 64.38 | 64.15 | 96.50 | 96.44 |
| Children | 64.08 | 63.64 | 96.35 | 96.08 |
| Coastguard | 64.24 | 64.24 | 96.36 | 96.35 |
| Container | 64.24 | 63.56 | 96.45 | 96.20 |
| Foreman | 64.24 | 64.29 | 96.36 | 96.37 |
| Hall Monitor | 64.23 | 63.79 | 96.36 | 96.32 |
| Mobile | 64.28 | 64.36 | 96.35 | 96.35 |
| m&d | 64.26 | 64.31 | 96.35 | 96.42 |
| Sean | 64.28 | 64.10 | 96.45 | 96.37 |
| Silent voice | 64.24 | 64.24 | 96.35 | 96.39 |
| Stefan | 64.52 | 64.62 | 96.68 | 96.66 |
| Table | 63.90 | 61.59 | 96.32 | 95.28 |
| Weather | 64.11 | 64.27 | 96.39 | 96.39 |
| Average | 64.23 | 63.94 | 96.41 | 96.28 |

TABLE 2

| | ZRPS TMN-8 | | TMN-8 | | PSNR | Speed |
| --- | --- | --- | --- | --- | --- | --- |
| Sequence | PSNR | Frame | PSNR | Frame | Gain | Up |
| Akiyo | 39.63 | 295 | 39.22 | 292 | 0.41 | 3.70 |
| Children | 26.60 | 276 | 26.40 | 276 | 0.20 | 3.33 |
| Coastguard | 28.54 | 295 | 28.38 | 295 | 0.16 | 2.17 |
| Container | 34.55 | 293 | 34.01 | 292 | 0.54 | 3.13 |
| Foreman | 29.87 | 281 | 29.74 | 283 | 0.13 | 2.08 |
| Hall Monitor | 36.14 | 294 | 35.06 | 294 | 1.08 | 4.17 |
| Mobile | 23.08 | 266 | 23.07 | 268 | 0.01 | 1.69 |
| m&d | 37.20 | 296 | 37.00 | 296 | 0.20 | 2.38 |
| Sean | 36.30 | 295 | 35.26 | 291 | 1.04 | 3.70 |
| Silent voice | 33.24 | 295 | 32.71 | 295 | 0.53 | 2.94 |
| Stefan | 24.15 | 205 | 24.12 | 205 | 0.03 | 2.04 |
| Table | 31.34 | 273 | 30.74 | 273 | 0.60 | 3.57 |
| Weather | 30.93 | 283 | 29.33 | 284 | 1.60 | 4.55 |
| Average | 31.66 | 280.54 | 31.16 | 280.31 | 0.50 | 3.03 |

TABLE 3

| | ZRPS TMN-8 | | TMN-8 | | PSNR | Speed |
| --- | --- | --- | --- | --- | --- | --- |
| Sequence | PSNR | Frame | PSNR | Frame | Gain | Up |
| Akiyo | 41.52 | 296 | 41.31 | 297 | 0.21 | 3.23 |
| Children | 28.61 | 294 | 27.98 | 293 | 0.63 | 2.94 |
| Coastguard | 30.30 | 297 | 30.26 | 297 | 0.04 | 1.64 |
| Container | 36.28 | 296 | 35.91 | 295 | 0.37 | 2.27 |
| Foreman | 31.73 | 294 | 31.67 | 294 | 0.06 | 1.59 |
| Hall Monitor | 37.86 | 296 | 37.59 | 296 | 0.27 | 2.63 |
| Mobile | 24.15 | 292 | 24.15 | 292 | 0.00 | 1.41 |
| m&d | 38.89 | 298 | 38.80 | 298 | 0.09 | 1.96 |
| Sean | 38.73 | 297 | 38.14 | 295 | 0.59 | 3.03 |
| Silent voice | 35.42 | 297 | 35.01 | 297 | 0.41 | 2.38 |
| Stefan | 25.14 | 261 | 25.07 | 262 | 0.07 | 1.72 |
| Table | 33.09 | 295 | 32.52 | 294 | 0.57 | 2.70 |
| Weather | 33.43 | 288 | 32.01 | 290 | 1.42 | 3.85 |
| Average | 33.47 | 292.38 | 33.11 | 292.31 | 0.36 | 2.41 |

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method comprising:
   determining, by a computing device, a plurality of quantization factors for a respective plurality of blocks of pixels of an image, wherein determining includes identifying blocks with at least one anticipated quantized transform coefficient being non-zero as non-zero residue blocks;

encoding or transcoding the image, by the computing device, wherein the encoding or transcoding includes:
  using the determined plurality of quantization factors for the respective plurality of blocks of pixels of the image; and
  performing rate control optimization during the encoding or transcoding considering only non-zero residue blocks;
wherein identifying blocks as non-zero residue blocks comprises anticipating a total number of bits to be used to encode the quantized transform coefficients and considering a quantized transform coefficient to be zero if the anticipated total number of bits is below a predetermined number.

2. The method of claim 1, wherein the anticipated total number of bits and the predetermined number are based on past history.

3. The method of claim 1, wherein the anticipated total number of bits is based on statistics of one or more neighboring blocks.

4. The method of claim 1, wherein said encoding or transcoding comprises transcoding the image, and wherein the anticipated total number of bits to encode each block is a function of an input bit rate for the block and an expected bit rate reduction due to transcoding.

5. The method of claim 1, further comprising dividing said plurality of blocks into luminance sub-blocks and chrominance sub-blocks.

6. The method of claim 5, wherein anticipating a total number of bits to be used to encode the quantized transform coefficients comprises anticipating a total number of bits to be used to encode the quantized transform coefficients of the luminance sub-blocks and the chrominance sub-blocks.

7. A method comprising:
determining, by a computing device, a plurality of quantization factors for a respective plurality of blocks of pixels of an image, wherein determining includes identifying blocks with at least one anticipated quantized transform coefficient being non-zero as non-zero residue blocks;
encoding or transcoding the image, by the computing device, wherein the encoding or transcoding includes:
  using the determined plurality of quantization factors for the respective plurality of blocks of pixels of the image; and
  performing rate control optimization during the encoding or transcoding considering only non-zero residue blocks;
wherein:
identifying blocks as non-zero residue blocks comprises:
  dividing said plurality of blocks into luminance sub-blocks and chrominance sub-blocks; and
  identifying an anticipated number of non-zero quantized transform coefficients of the luminance sub-blocks and the chrominance sub-blocks by anticipating a total number of bits to be used to encode the quantized transform coefficients of the luminance sub-blocks and the chrominance sub-blocks and considering a quantized transform coefficient to be zero if the anticipated total number of bits is below a predetermined number.

8. The method of claim 7, wherein the anticipated total number of bits is based on past history.

9. The method of claim 7, wherein the anticipated total number of bits is based on statistics of one or more neighboring blocks.

10. The method of claim 7, wherein said encoding or transcoding comprises transcoding the image, and wherein the anticipated total number of bits to encode the luminance sub-blocks and the chrominance sub-blocks is equal to a difference between an input bit rate for the luminance sub-blocks and the chrominance sub-blocks and an expected bit rate reduction due to transcoding.

11. The method of claim 7, wherein said encoding or transcoding comprises encoding the image, and wherein non-zero residue blocks are considered in a rate control optimization algorithm in said encoding.

12. The method of claim 1, wherein the image comprises an image of a video.

13. An apparatus comprising:
one or more computer processors;
logic configured to execute on the one or more computer processors to:
  determine a plurality of quantization factors for respective blocks of pixels out of a plurality of blocks of pixels of an image, wherein the logic is configured to determine the plurality of quantization factors through identification of blocks with at least one anticipated quantized transform coefficient being non-zero as non-zero residue blocks; and
  encode or transcode the image, wherein the logic is configured to encode or transcode the image through use of the determined plurality of quantization factors for the respective plurality of blocks of pixels of the image and through performance of rate control optimization during the encoding or transcoding considering only non-zero residue blocks;
wherein identification of blocks as non-zero residue blocks comprises anticipation of a total number of bits to be used to encode the quantized transform coefficients and consideration of a quantized transform coefficient to be zero if the anticipated total number of bits is below a predetermined number; and
wherein the anticipation of a total number of bits to be used to encode the quantized transform coefficients is based on statistics of temporally or spatially neighboring blocks.

14. The apparatus of claim 13,
wherein the identification of blocks as non-zero residue blocks further comprises division of said plurality of blocks into luminance sub-blocks and chrominance sub-blocks, and anticipation of a total number of bits to be used to encode the quantized transform coefficients comprises anticipation of a total number of bits to be used to encode the quantized transform coefficients of the luminance sub-blocks and the chrominance sub-blocks.

15. The apparatus of claim 13, wherein the image comprises an image of a video.

16. An article of manufacture comprising:
a computer-readable storage device;
a plurality of instructions embodied in the storage device, and configured to enable a computing device, in response to execution of the programming instructions by the computing device, to perform a plurality of operations, including:
  determining a plurality of quantization factors for a respective plurality of blocks of pixels of an image, comprising identifying blocks with at least one anticipated quantized transform coefficient being non-zero as non-zero residue blocks, and encoding or transcoding the image, including using the determined plurality of quantization factors for the respective plurality of blocks of pixels of the image; and wherein identifying blocks as non-zero residue blocks comprises anticipating a total number of bits to be used to encode the quantized transform coefficients and considering a quantized transform coefficient to be zero if the anticipated total number of bits is below a predetermined number; and wherein the anticipating is based on statistics of temporally and/or spatially neighboring blocks.

17. The article of claim 16, wherein said identifying blocks as non-zero residue blocks further comprises dividing said plurality of blocks into luminance sub-blocks and chrominance sub-blocks, and anticipating a total number of bits to be used to encode the quantized transform coefficients comprises anticipating a total number of bits to be used to encode the quantized transform coefficients of the luminance sub-blocks and the chrominance sub-blocks.

18. The article of claim 16, wherein the image comprises an image of a video.

\* \* \* \* \*

UNITED STATES PATENT AND TRADEMARK OFFICE
CERTIFICATE OF CORRECTION

PATENT NO.        : 8,442,113 B2                                    Page 1 of 1
APPLICATION NO.   : 11/553877
DATED             : May 14, 2013
INVENTOR(S)       : Au et al.

It is certified that error appears in the above-identified patent and that said Letters Patent is hereby corrected as shown below:

In the Specification

In Column 4, Line 65, delete "kdps" and insert -- kbps --, therefor.

In Column 5, Line 2, delete "kdps" and insert -- kbps --, therefor.

In Column 5, Line 6, delete "kdps" and insert -- kbps --, therefor.

In Column 5, Line 10, delete "kdps" and insert -- kbps --, therefor.

In Column 5, Line 14, delete "kdps" and insert -- kbps --, therefor.

In Column 5, Line 18, delete "kdps" and insert -- kbps --, therefor.

In Column 5, Line 22, delete "kdps" and insert -- kbps --, therefor.

In Column 5, Line 26, delete "kdps" and insert -- kbps --, therefor.

In Column 5, Line 30, delete "kdps" and insert -- kbps --, therefor.

In Column 5, Line 34, delete "kdps" and insert -- kbps --, therefor.

In Column 5, Line 38, delete "kdps" and insert -- kbps --, therefor.

In Column 5, Line 42, delete "kdps" and insert -- kbps --, therefor.

In Column 5, Line 46, delete "kdps" and insert -- kbps --, therefor.

Signed and Sealed this
Fifth Day of August, 2014

Michelle K. Lee
*Deputy Director of the United States Patent and Trademark Office*